United States Patent [19]

Overbey

[11] 4,135,262

[45] Jan. 23, 1979

[54] DUAL FLUSH DEVICES FOR TOILETS

[76] Inventor: Charles A. Overbey, 16 Bougainvillea Dr., Cocoa Beach, Fla. 32931

[21] Appl. No.: 820,418

[22] Filed: Aug. 1, 1977

[51] Int. Cl.² .............................................. E03D 5/092
[52] U.S. Cl. ...................................................... 4/325
[58] Field of Search .................... 4/67 A, 67 R, 57 R, 4/57 P, 53, 55, 41, 52, 61, 62, 63, 325, 326

[56] References Cited

U.S. PATENT DOCUMENTS

| | | | |
|---|---|---|---|
| 934,353 | 9/1909 | Prichett | 4/325 |
| 3,885,253 | 5/1975 | Overbey | 4/67 A |
| 4,032,997 | 7/1977 | Phripp et al. | 4/67 A |

*Primary Examiner*—Steven L. Stephan

[57] ABSTRACT

Improvements applicable to dual flush devices for saving of water in toilets. Included are improvements in float designs, a positioner for flapper/ball valves, surface tension reduction features, novel float retaining means, triggering means for dual flush devices, pushbutton operation of dual flush devices, and a method for traversing the toilet tank wall with controlling means for dual flush devices.

3 Claims, 21 Drawing Figures

U.S. Patent   Jan. 23, 1979   Sheet 1 of 3   4,135,262
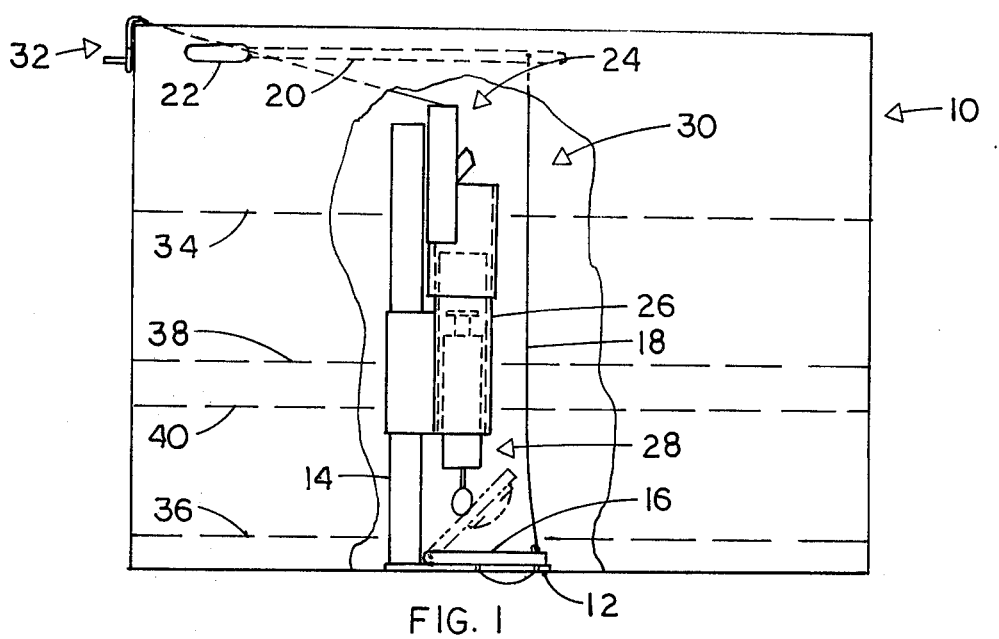
FIG. 1
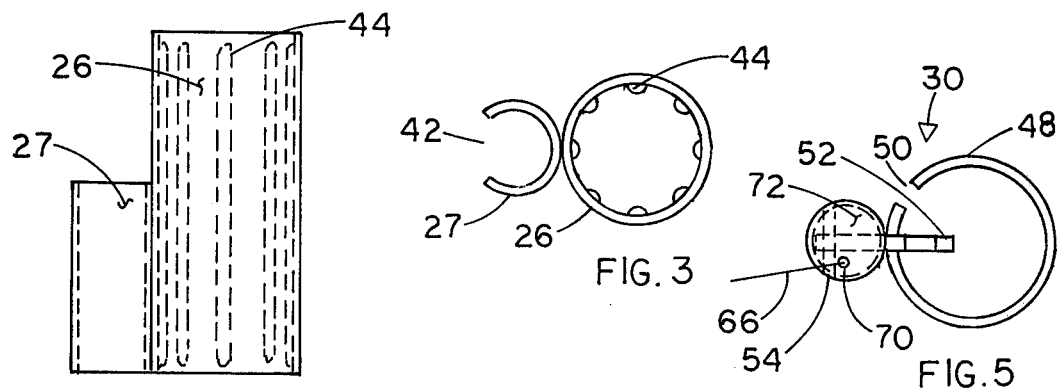
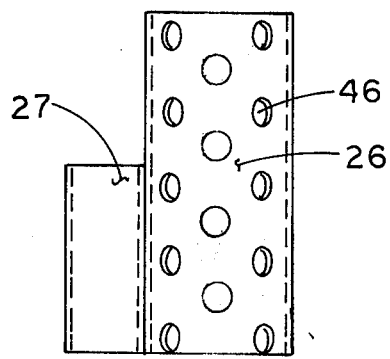
FIG. 2
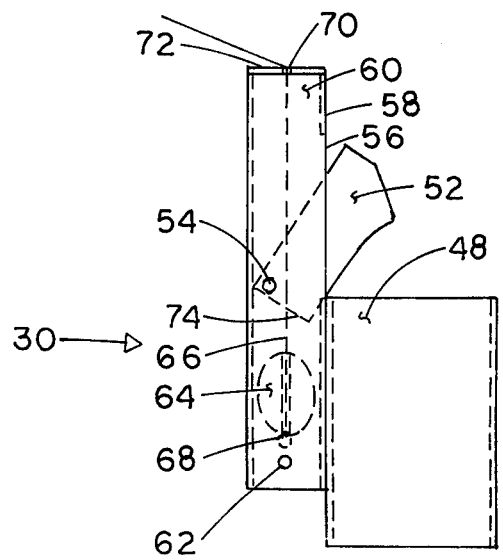
FIG. 4
FIG. 6

DUAL FLUSH DEVICES FOR TOILETS

The present invention relates to improvements in design features of components that may be used with various water-saving devices for toilets. These features may be used with my previously patented water saving device U.S. Pat. No. 3,885,253 or with other water-saving devices for toilets.

Prior art includes many devices for saving water in toilets including those devices that provide a dual flush capability. Most of these devices have many limitations which make them undesirable for broad use by the homeowner. Some devices have varying degrees of reliability regarding closing time of the toilet tank outlet valve. Others have excessively complex means for operation of the dual flush capability from a position external to the tank, others have a fixed, or non-variable, point at which the tank outlet valve closes. These and other objections are overcome by the improvements for dual fush devices covered by the present invention.

Objects and advantages of these improvements may be easily understood from the accompanying description and drawings.

FIG. 1 is a cutaway front elevational view showing a dual flush device installed in a conventional toilet tank.

FIG. 2 is an elevational view of the float race and its supporting structure shown in FIG. 3.

FIG. 3 is a plan view of the float race and its supporting structure shown in FIG. 2.

FIG. 4 is an elevational view of an alternate type of float race.

FIG. 5 is a plan view of the retaining device shown in FIG. 6.

FIG. 6 is an elevational view of the retaining device shown in FIG. 5.

Figure 7:
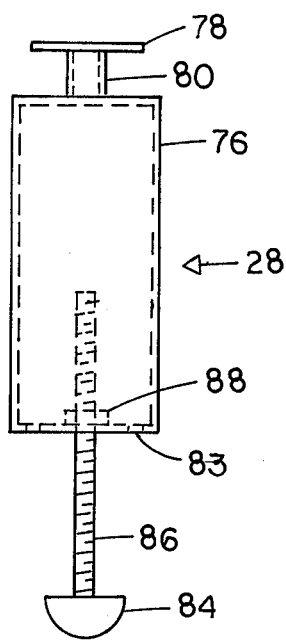
FIG. 7 is an elevational view of a float.

With reference to FIG. 1, a conventional toilet tank assembly designated generally by reference numeral 10 is illustrated with some of the improvements covered by the present invention incorporated as a part of the overall system. The tank lid, the conventional ballcock and float, and the pull chain to flapper/ball 16 when it is in the open or "up" position are omitted for clarity. The reference numeral 12 designates a conventional outlet valve seat assembly at the bottom of the tank. The reference numeral 14 designates a conventional tank water overflow standpipe which is conventionally supported by and attached to the outlet valve seat assembly 12. The reference numeral 16 designates one type of conventional valve flapper/ball which is shown in its closed or seated position and in its open position. The conventional valve opening mechanism includes a pull chain 18, a lever 20 and a handle 22. The dual flush device covered by my U.S. Pat. No. 3,885,253 and incorporating some of the improvements herein described, is designated generally by the reference numeral 24. Dual flush device 24 is shown mounted on standpipe 14.

Referring again to FIG. 1, the dual flush device includes the following: A means for guiding a float is provided by the float race designated by reference numeral 26. Although a cylinder is shown herein any suitable means for guidance may be used. A means for application of force to close the tank outlet valve is provided by a float designated generally by reference numeral 28. A means for retaining the float so it may not travel unless released to do so is provided by an adjustable retaining device designated generally by reference numeral 30. This retaining device 30 functions primarily as a stop for limiting downward travel of the float. A means for automatic reset is also provided by adjustable retaining device 30. A means for triggering operation of the dual flush device 24 is provided by a triggering mechanism designated generally by reference numeral 32.

Referring again to FIG. 1, the horizontal broken lines designated by reference numerals 34, 36, 38 and 40 are imaginary lines indicating tank water levels. Tank water level with a full tank is designated by reference numeral 34. Tank water level with an "empty" tank is designated by reference numral 36. Approximate tank water level when the float 28 is just starting to close flapper/ball 16 is designated by reference numeral 38. Approximate tank water level after the float 28 has imposed controlling forces on flapper/ball 16 so that it has closed is designated by reference numeral 40.

Referring to FIGS. 2 and 3, the float race 26 has a support structure 27 to facilitate its mounting in the toilet tank on standpipe 14 as illustrated in FIG. 1. The support structure 27 may be of plastic or metal with a split 42 running its length as shown in FIG. 3. Split 42 enables support structure 27 to be conveniently slipped over the existing standpipe 14, and be adjustable both vertically and rotationally. Although this method of mounting is described, it can also be accomplished by many other simple mechanical means. The float race 26 may have internal longitudinal ribs 44 to reduce surface tension between the float race 26 and float 28. Ribs 44 may be omitted if they are not needed. FIG. 4 illustrates an alternate design of the float race 26 having holes 46 through the sidewall. These holes reduce surface tension between the float race 26 and the float 28. FIGS. 5 and 6 illustrate the retaining device 30 wherein the sleeve 48 has a split 50 to permit adjustment of the mounting position of retaining device 30 on float race 26. In further reference to FIGS. 5 and 6, stop 52 rotates about pivot 54 and is extended by gravity through slot 56 in the sidewall 58 of post 60. Referring to FIG. 6 a stop 62 is located in the lower part of post 60 to retain weight 64 in post 60. Weight 64 is retained on flexible tension member 66 by knot 68. The flexible tension member 66, which is a component of triggering mechanism 32 shown in FIG. 1, passes through hole 70 in cap 72 of post 60. It may be clearly seen that when weight 64 is pulled upward by flexible tension member 66 it will strike angled surface 74 of stop 52 and thereby retract stop 52 into post 60 by forcing it to rotate about pivot 54. When triggering mechanism 32 is released weight 64 descends in post 60 and stop 52 is free to return by gravitational force to the position shown in FIG. 6. As the weight 64 descends in post 60 it continues to exert tension forces on flexible tension member 66. This force in flexible tension member 66 returns triggering means 32, as shown in FIG. 1, to a position where it will be ready to perform the next triggering action upon command of the toilet user.

FIGS. 7, 8, 9, 10, 11, 12 and 13 show alternate constructions of float 28.

Figure 8:
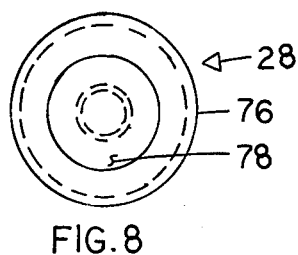
FIG. 8 is plan view of a float shown in FIG. 7.
Figure 10:
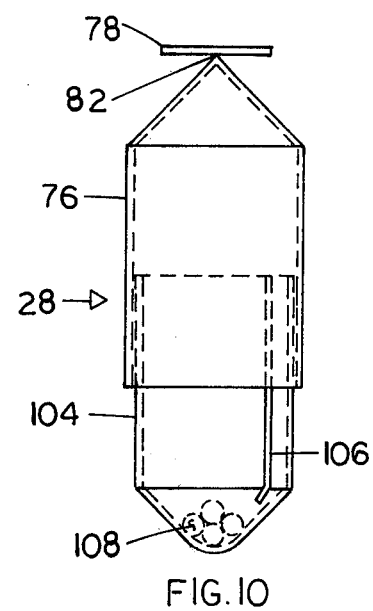
FIG. 10 is an elevational view of another alternate float.
Figure 9:
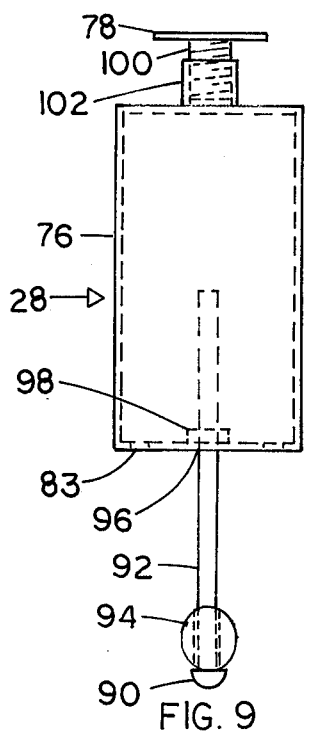
FIG. 9 is an elevational view of an alternate float.
Figure 11:
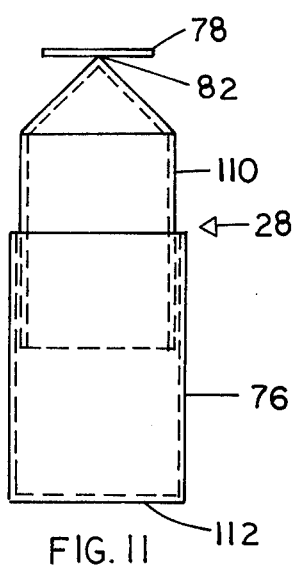
FIG. 11 is an elevational view of yet another alternate float.
Figure 12:
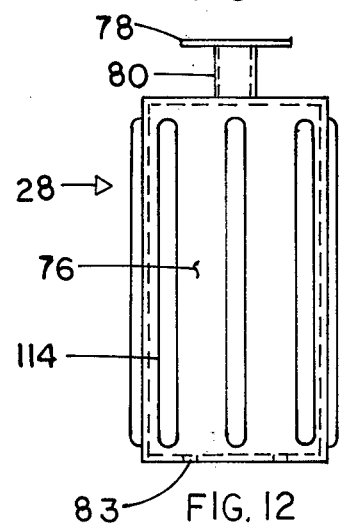
FIG. 12 is an elevational view of an alternate body design for a float shown in FIG. 13.

Referring to FIGS. 7, 8, 9, 10, 11, 12 and 13 the outer shell of the float 28 is designated by the numeral 76. This shell 76 provides the buoyancy for the float 28. FIGS. 7, 8, 9, 10, 11, 12 and 13 show a cap 78 attached to the top of float 28. In FIGS. 7, 8, 12 and 13 the cap 78 is attached to projection 80 from shell 76. FIG. 9 shows cap 78 attached to threaded rod 100. FIGS. 10 and 11 show cap 78 attached to the apex 82 of the conical shape of the top end of shell 76, and upper body 110 respectively. FIGS. 7, 9 and 12 show vent holes 83 in shell 76. Elevational views, FIGS. 7, 9 and 10 illustrate floats having variable effective lengths. By varying the effective lengths of these floats 28, the partial flush water level 40, FIG. 1, may be varied. This effective length of float 28 may be varied and set to close flapper/ball 16 at a water level 40 corresponding to the maximum water saving that a particular toilet is capable of producing.

FIG. 7 shows one method of varying the effective length of the float 28. A weight 84 is attached to threaded rod 86. The effective length of float 28 is varied by turning threaded rod 86 in and out of tapped doubler 88 and thereby varying the water level 40 shown in FIG. 1 at which the flapper/ball 16 of FIG. 1 closes.

FIG. 8 is a plan view of FIG. 7 showing the float 28, shell 76 and cap 78.

FIG. 9 illustrates an alternate float 28 similar to the float 28 in FIG. 7. However, in FIG. 9 the bulbous end 90 of rod 92 retains weight 94 on rod 92. Rod 92 is smooth of surface and close-fitted to a hole 96 through shell 76 and doubler 98. The effective length of float 28 is here varied by slipping rod 92 in and out of shell 76. Rod 92 is held in position by friction. FIG. 9 also shows a method for varying the height of cap 78 above shell 76 by turning threaded rod 100 in or out of internally threaded extension 102 of shell 76.

FIG. 10 shows another alternate float 28. Effective length of float 28 in FIG. 10 is varied by shifting the bullet-shaped lower body 104 in and out of shell 76. Lower body 104 has a vent slot 106 and retains weights 108.

FIG. 11 shows another alternate float 28 wherein the shell 76 is sealed across its bottom surface 112 against entry of water. The height of cap 78 above bottom surface 112 is varied by moving upper body 110 in or out of shell 76.

Figure 13:
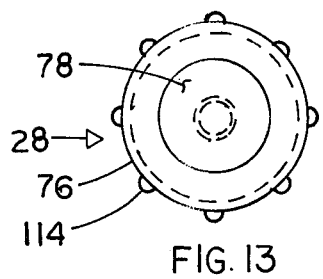
FIG. 13 is a plan view of an alternate body design of a float shown in FIG. 12.

FIGS. 12 and 13 show an alternate configuration for shell 76 of float 28 wherein external ribs 114 are a part of shell 76 and reduce surface tension when sliding in a float race 26 as shown in FIG. 1.

Figure 14:
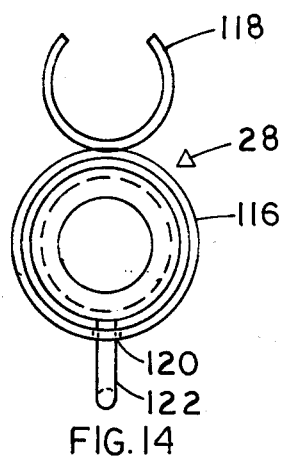
FIG. 14 is a plan view of an alternate float race and an alternate float shown in FIG. 15.
Figure 15:
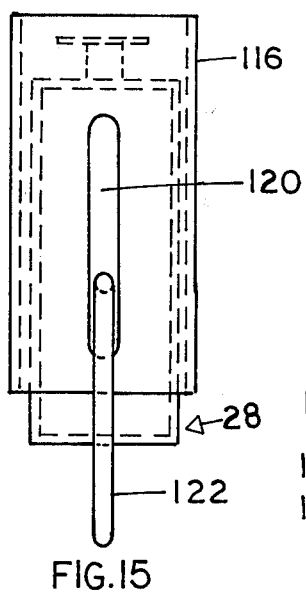
FIG. 15 is an elevational view of an alternate float race and an alternate float shown in FIG. 14.

FIGS. 14 and 15 illustrate an alternate float race 116 having a support structure 118 as shown in FIG. 14 and an aperture 120 through which extension arm 122 of float 28 projects. It is obvious that extension arm 122 of float 28 can be so shaped and so employed as to reach out and apply a closing force to any toilet outlet valve, including valves having shapes quite different from the shape of flapper/ball valve 16 shown in FIG. 1. It is also obvious that extension arm 122 can be configured to reach any desired point of load application on an outlet valve.

Figure 16:
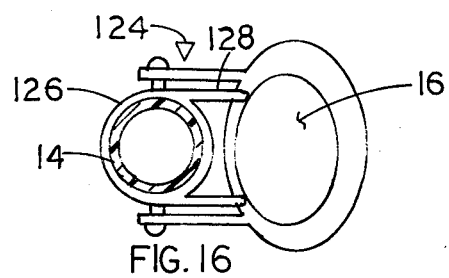
FIG. 16 is a plan view of a flapper positioner for a valve flapper shown in FIG. 17.
Figure 17:
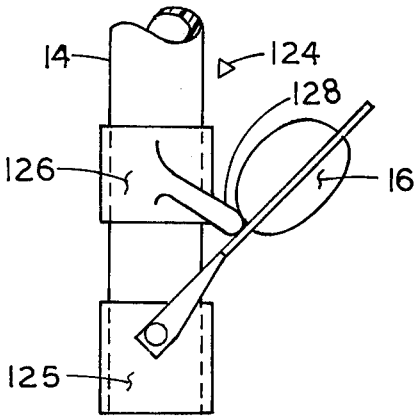
FIG. 17 is an elevational view of flapper positioner for a valve flapper shown in FIG. 16.

FIGS. 16 and 17 show a flapper positioner designated generally by the numeral 124, comprising a supporting structure 126 and projections 128. Standpipe 14, flapper/ball 16 and flapper/ball pivot support 125 are also shown. Flapper positioner 124 is placed on standpipe 14 to restrict the angular travel upward of a flapper/ball 16 so flapper/ball 16 will present a useable surface for contact with the float 28 shown in FIG. 1. Flapper positioner 124 is only needed with certain flapper/balls 16 wherein the flapper top surface is of rough or odd shape. The function of flapper positioner 124 is clearly shown in FIGS. 16 and 17.

Figure 18:
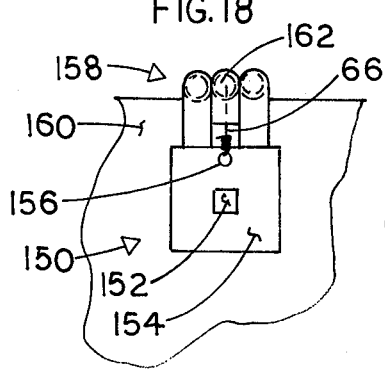
FIG. 18 is a front elevational view of a push button shown in FIG. 19.
Figure 19:
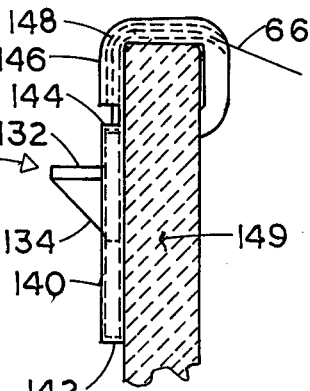
FIG. 19 is a side elevational view of a push button shown in FIG. 18.

FIGS. 18 and 19 illustrate one configuration of a push button means generally designated by the numeral 130 for use in actuating a dual flush device. The plate 132 is assembled to plate 136 and is supported by angle 134. Plate 136 has a hole 138 through which flexible tension member 66 is affixed to push button 130. Push button 130 is slidably mounted in channels 140 which has stops 142 and 144 at its ends to limit the travel of push button 130. Channels 140 are integral with clip 146 which has a hole 148 through it to permit passage of flexible tension member 66 over toilet tank wall 149 to the inside of conventional toilet tank assembly 10 as shown in FIG. 1. In operation, the finger depresses push button 130, thereby triggering action of the dual flush device 24 inside the toilet tank assembly 10, FIG. 1. This push button provides a unique means for actuating almost any dual flush device.

Figures 20, 21:
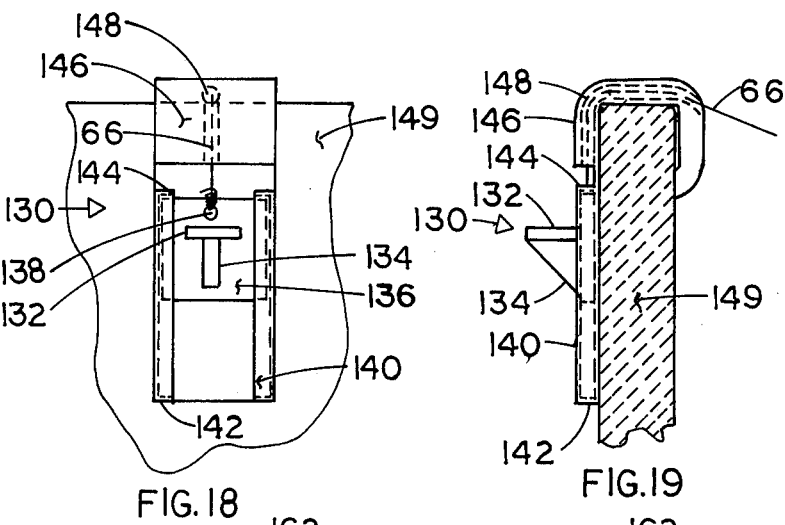
FIG. 20 is a front elevational view of an alternate push button shown in FIG. 21.
FIG. 21 is a side elevational view of an alternate push button shown in FIG. 20.

FIGS. 20 and 21 show an alternate push button means configuration. The push-button designated generally by numeral 150 is comprised of arm 152 integral to plate 154. Plate 154 has hole 156 through which flexible tension member 66 is affixed to push button 150. A clip designated generally by numeral 158 is mounted on toilet tank wall 160. Clip 158 has a hole 162 through it, as shown in FIGS. 20 and 21. As shown in FIG. 21, the flexible tension member 66 is threaded through clip 158 starting at a small hole in the clip at location 164 and continuing past the end of the clip at location 166 where it then terminates by attachment to push button 150. In operation, the finger depresses push button 150, thereby triggering action of the dual flush device 24 inside the toilet tank assembly 10. This push button provides a novel means for actuating almost any dual flush device.

In operation, it is apparent that the user of the toilet may obtain a full flush by operating only handle 22 in FIG. 1. It is also apparent that when handle 22 and then triggering mechanism 32 are operated, action by the dual flush device is initiated, resulting in a water saving flush.

Improvements in dual flush devices as described herein may be used with many types of dual flush devices.

I claim:

1. A water-saving device for a toilet having a water tank, an outlet valve to discharge water from said tank and a mechanism for operating said outlet valve to substantially empty the water from said tank, comprising:
   (A) a float movably mounted in said tank to selectively close said outlet valve;
   (B) a retaining device mounted in said tank to normally prevent said float from closing said outlet valve when said mechanism is operated to substantially empty the water from said tank;
   (C) a control apparatus connected to said retaining device for selectively releasing said retaining device to permit said float to prematurely close said outlet valve to effectuate only a partial emptying of the water from said tank; and
   (D) means for varying the effective length of said float to readily preselect the most optimum premature closing of said outlet valve and thereby retain a water level in said tank corresponding to the maximum water savings that said toilet is capable of producing;
   (E) said means for varying the effective length of said float includes:
      (1) a body portion slidably mounted in a bottom portion of said float;
      (2) a vent slot in said body portion;
      (3) a rounded end portion mounted on said body portion; and
      (4) a weight carried in said rounded end portion.

2. A water saving device for a toilet having a water tank, an outlet valve to discharge water from said tank and a mechanism for operating said outlet valve to substantially empty the water from said tank, comprising:
   (A) a float assembly moveably mounted in said tank to cause early closing of said outlet valve;
   (B) a retaining device mounted in said tank to normally prevent said float assembly from closing said outlet valve when said mechanism is operated to substantially empty the water from said tank;
   (C) A control apparatus for selectively releasing said retaining device to permit said float assembly to prematurely close said outlet valve to effectuate only a partial emptying of the water from said tank;
   (D) said control apparatus including a track member and a push button;
   (E) said track member having a clip portion and a track portion, said track portion being mounted adjacent an external surface of said water tank and held in place by said clip portion;
   (F) said push button being moveably mounted on said track portion; said push button and track portion interengaging such that said push button is held from twisting as it is moved along said track portion.

3. A water-saving device for a toilet having a water tank, an outlet valve to discharge water from said tank and a mechanism for operating said outlet valve to substantially empty the water from said tank, comprising:
   (A) a float movably mounted in said tank to selectively close said outlet valve;
   (B) A retaining device mounted in said tank to normally block said float from closing said outlet valve when said mechanism is operated to substantially empty the water from said tank;
   (C) A control apparatus connected to said retaining device to unblock said float to prematurely close said outlet valve to effectuate only a partial emptying of the water from said tank;
   (D) said retaining device including a stop pivotally mounted to interfere with travel of said float in a downward direction, and said stop having an angled surface on the bottom thereof;
   (E) said control apparatus including a flexible tension member having opposite ends;
   (F) a weight attached to one of said opposite ends of said tension member and suspended in a manner to maintain tension in said tension member so as to keep the other of said opposite ends under tension;
   (G) said weight being adapted to be pulled into engagement with said angled surface of said top to retract said stop;
   (H) said weight being suspended independently of said stop so said stop is free of the gravity load of said weight.

* * * * *